(12) United States Patent  
Lenz

(10) Patent No.: US 12,342,804 B2
(45) Date of Patent: *Jul. 1, 2025

(54) FISHING NET SUPPORT SYSTEM

(71) Applicant: Matthew James Lenz, Brooklyn Park, MN (US)

(72) Inventor: Matthew James Lenz, Brooklyn Park, MN (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/141,997

(22) Filed: May 1, 2023

(65) Prior Publication Data

US 2023/0270089 A1   Aug. 31, 2023

(51) Int. Cl.
| *A01K 77/00* | (2006.01) |
| *A01K 75/00* | (2006.01) |
| *A01K 97/10* | (2006.01) |
| *B63B 3/00* | (2006.01) |

(52) U.S. Cl.
CPC .............. *A01K 77/00* (2013.01); *A01K 75/00* (2013.01); *A01K 97/10* (2013.01); *B63B 3/00* (2013.01)

(58) Field of Classification Search
CPC ......... A01K 77/00; A01K 75/00; A01K 97/10
USPC ..... 43/7, 8, 11, 12, 21.2; 248/511, 514, 515, 248/534, 535, 538
See application file for complete search history.

(56) References Cited

U.S. PATENT DOCUMENTS

| 1,532,367 | A | * | 4/1925 | Bockman | B63H 16/06 |
| | | | | | 114/364 |
| 1,793,910 | A | * | 2/1931 | Cuthbert | B43M 99/003 |
| | | | | | 211/69.7 |
| 2,458,881 | A | * | 1/1949 | Steuer | A01K 97/10 |
| | | | | | 248/514 |
| 3,006,588 | A | * | 10/1961 | Lemi | A01K 97/10 |
| | | | | | 248/512 |
| 3,010,687 | A | * | 11/1961 | Hagberg | A01K 97/10 |
| | | | | | 248/314 |
| 3,031,789 | A | * | 5/1962 | Edgington | A01K 73/12 |
| | | | | | 43/55 |
| 3,708,141 | A | * | 1/1973 | Friedgen | A01K 97/10 |
| | | | | | 248/314 |
| 4,815,227 | A | * | 3/1989 | Flanders, Sr. | A01K 77/00 |
| | | | | | 43/7 |
| 4,894,943 | A | * | 1/1990 | Allen | A01K 79/00 |
| | | | | | 43/6.5 |
| 5,005,813 | A | | 4/1991 | Lawrence | |
| 5,020,464 | A | * | 6/1991 | Rodrigues | A01K 77/00 |
| | | | | | 43/65 |
| 5,054,737 | A | * | 10/1991 | DeLancey | A01K 97/10 |
| | | | | | 248/515 |
| 5,099,597 | A | * | 3/1992 | Whistle | A01K 77/00 |
| | | | | | 440/109 |

(Continued)

FOREIGN PATENT DOCUMENTS

| GB | 2279219 | 4/1995 |
| KR | 200298783 Y1 * | 12/2002 |

(Continued)

*Primary Examiner* — Darren W Ark

(57) ABSTRACT

A fishing net support system includes a boat mount configured to be mounted onto a boat hull. A linkage is attached to the boat mount. A receiver can receive a pole of a fishing net. The receiver is mounted on the linkage, such that the linkage allows pivoting between the boat mount and the receiver within a vertical plane.

14 Claims, 10 Drawing Sheets

(56) References Cited

U.S. PATENT DOCUMENTS

| | | | | |
|---|---|---|---|---|
| 5,438,789 A * | 8/1995 | Emory | A01K 97/10 | 248/514 |
| 5,799,919 A * | 9/1998 | Orr | D05C 1/02 | 248/398 |
| 6,591,541 B1 * | 7/2003 | Cummings | A01K 97/10 | 248/514 |
| 6,918,203 B2 * | 7/2005 | Robichaud | A01K 77/00 | 43/6.5 |
| 6,974,113 B1 * | 12/2005 | Clark | A01K 97/10 | 248/521 |
| 6,978,570 B1 * | 12/2005 | Clark | A01K 91/08 | 248/289.11 |
| 7,104,003 B2 * | 9/2006 | Wilson | A01K 75/00 | 43/11 |
| 7,269,921 B2 * | 9/2007 | Lee | A01K 77/00 | 43/12 |
| 7,325,356 B2 * | 2/2008 | Norman | A01K 77/00 | 43/6.5 |
| 8,578,647 B2 | 11/2013 | Storch | | |
| 10,856,534 B2 * | 12/2020 | Waters | A01K 77/00 | |
| 11,079,064 B1 * | 8/2021 | Cifers | A01K 97/10 | |
| 11,659,823 B2 * | 5/2023 | Lenz | A01K 77/00 | 43/54.1 |
| 2003/0089021 A1 * | 5/2003 | Miller | A01K 97/10 | 43/21.2 |
| 2003/0230023 A1 * | 12/2003 | Lu | A01K 97/10 | 43/21.2 |
| 2006/0005451 A1 * | 1/2006 | Norman | A01K 77/00 | 43/6.5 |
| 2006/0102822 A1 * | 5/2006 | Liang | F16C 11/045 | 248/514 |
| 2010/0158605 A1 * | 6/2010 | Gargaro, III | A01K 97/10 | 403/336 |
| 2015/0366180 A1 * | 12/2015 | Chmura | A01K 97/10 | 248/125.7 |
| 2019/0216073 A1 * | 7/2019 | Tornow | A01K 97/10 | |
| 2024/0138386 A1 * | 5/2024 | Lenz | A01K 77/00 | |
| 2024/0334917 A1 * | 10/2024 | Kittelson | A01K 77/00 | |

FOREIGN PATENT DOCUMENTS

| | | |
|---|---|---|
| KR | 100860492 B1 * | 9/2008 |
| TW | M536848 U * | 2/2017 |
| WO | WO2007020434 | 2/2007 |

* cited by examiner

FISHING NET SUPPORT SYSTEM

CROSS-REFERENCE TO RELATED APPLICATIONS

I hereby claim the benefit under 35 U.S.C., Section 120 of U.S. application Ser. No. 17/464,337 filed Sep. 1, 2021, which in term has claimed the benefit under 35 U.S.C. Section 119(e) of U.S. Provisional application 63/082,098 filed Sep. 23, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fishing net pole gripping device and more particularly pertains to a new fishing net pole gripping device for allowing easy manipulation of a fishing net with one hand while also placing the fishing net in a location on a boat that is easily and quickly accessible when a person is otherwise fishing alone.

(2) Description of Related Art Including Information Disclosed Under 37 CFR 1.97 and 1.98

The prior art relates to fishing net pole gripping devices that are used to assist a person a person in lifting a net from the water but which include securing means that do not allow for easily manipulation of a fishing net while gripping a fishing rod.

BRIEF SUMMARY OF THE INVENTION

An embodiment of the disclosure meets the needs presented above by generally comprising a boat mount configured to be mounted onto a boat hull. A linkage is attached to the boat mount. A receiver can receive a pole of a fishing net. The receiver is mounted on the linkage, such that the linkage allows pivoting between the boat mount and the receiver within a vertical plane.

Another embodiment generally includes a boat hull having an upper edge defining a gunwale. A fishing net includes a pole and a loop attached to one end of the pole. A receiving net is attached to and extends along the loop and a grip is attached to the pole opposite of the loop. A boat mount is mounted onto the gunwale and a linkage is attached to the boat mount. A receiver is mounted on the linkage. The pole is positioned within the receiver such that the loop is positioned outside of an area bounded by the boat hull. The linkage allows pivoting between the boat mount and the receiver within a single plane to allow the loop to be moved upwardly and downwardly relative to the boat hull, the single plane is vertically orientated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
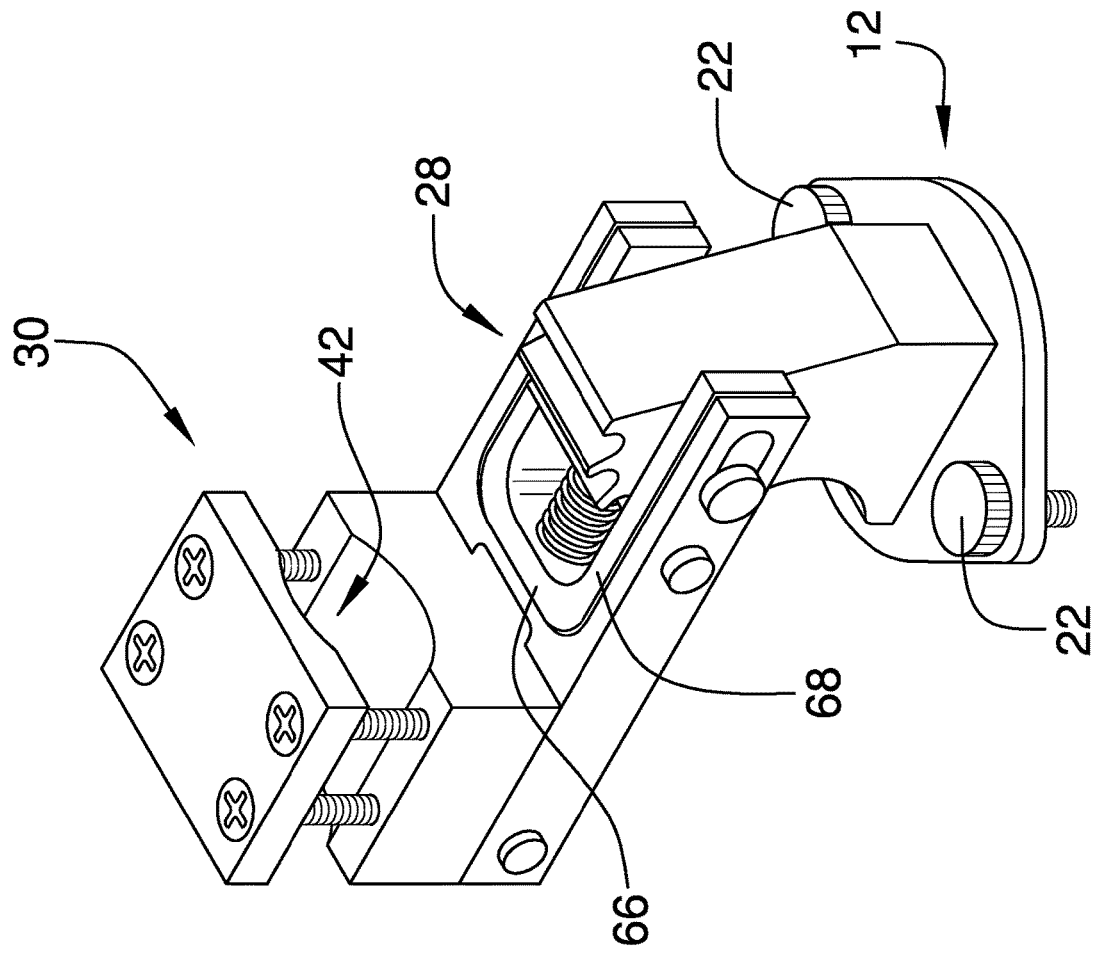
FIG. 1 is a rear isometric view of a fishing net support system according to an embodiment of the disclosure.
Figure 2:
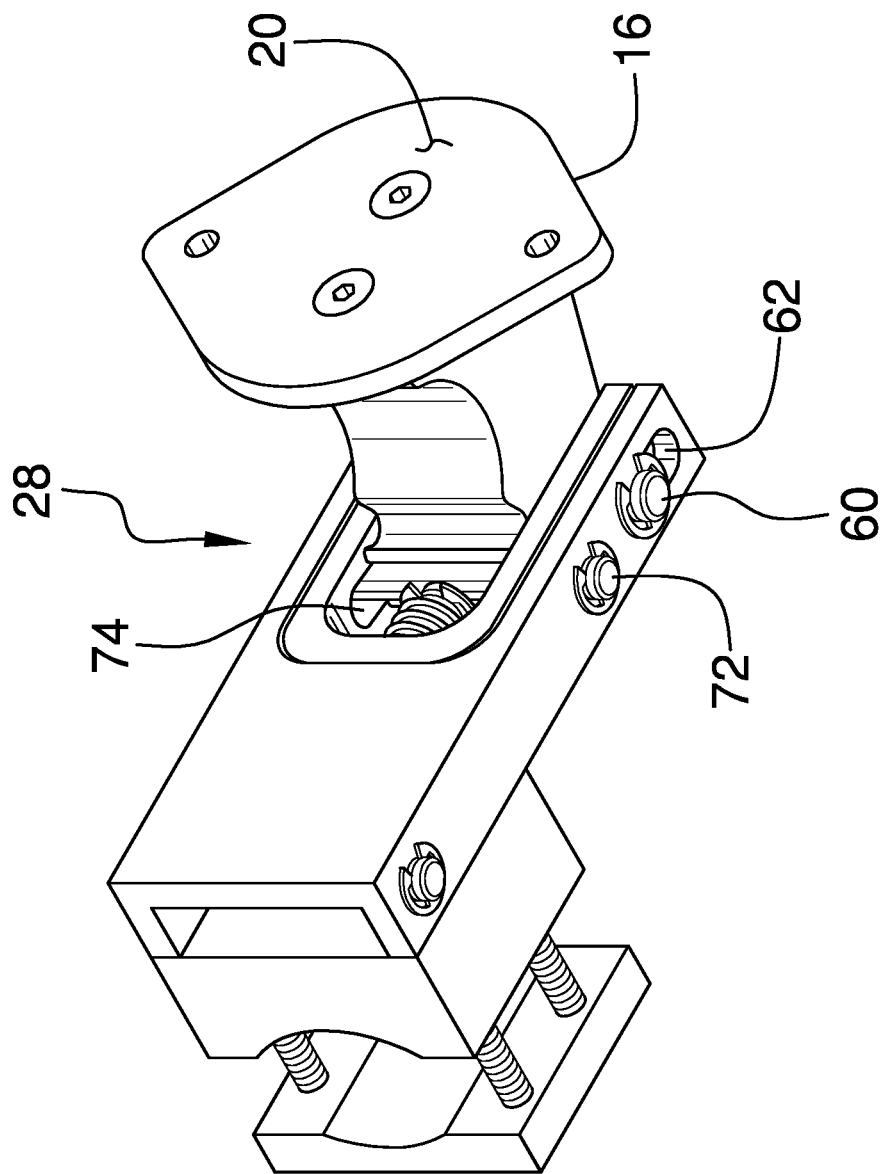
FIG. 2 is a bottom and front isometric view of an embodiment of the disclosure.
Figure 3:
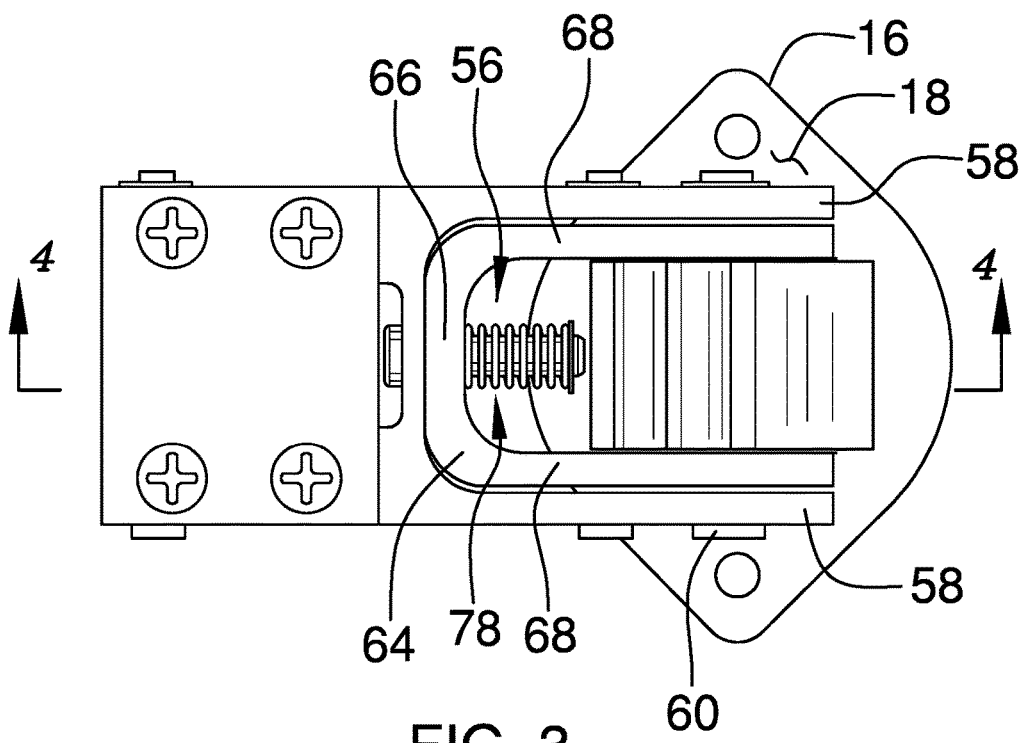
FIG. 3 is a top view of an embodiment of the disclosure.
Figure 4:
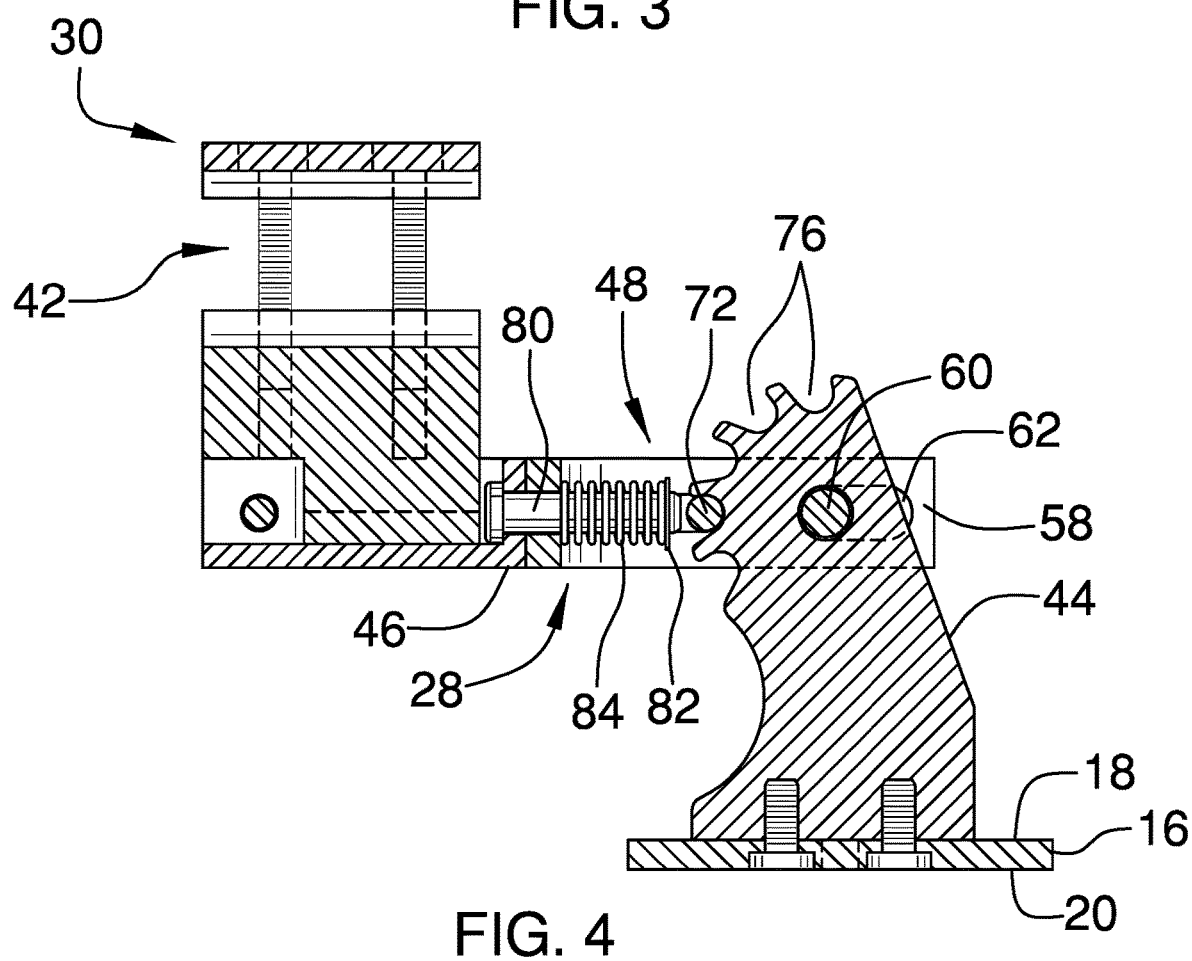
FIG. 4 is a cross-sectional view of an embodiment of the disclosure taken along line 4-4 of FIG. 3.
Figure 5:
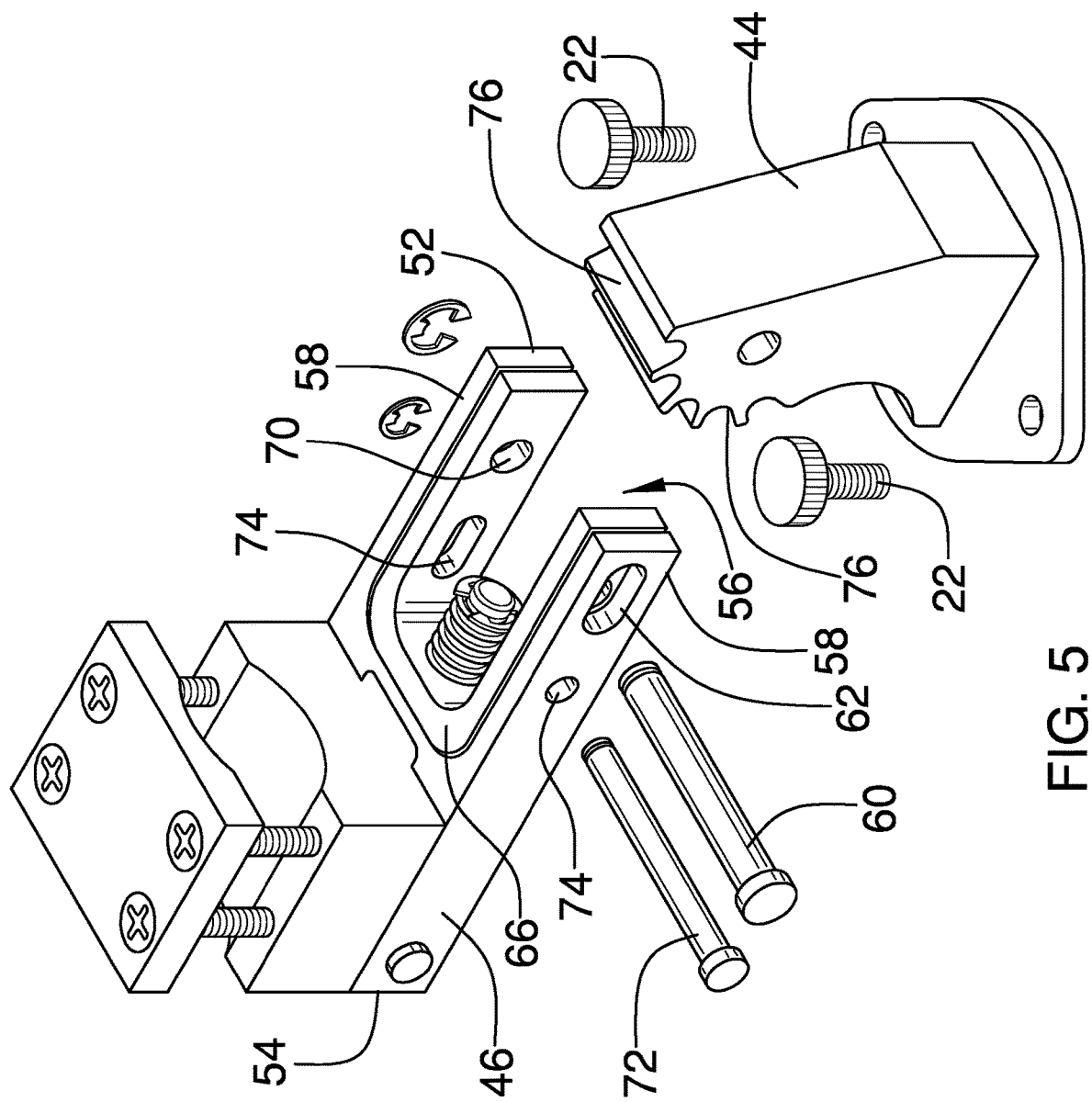
FIG. 5 is a rear isometric exploded view of an embodiment of the disclosure.

With reference now to the drawings, and in particular to FIGS. 1 through 11 thereof, a new fishing net pole gripping device embodying the principles and concepts of an embodiment of the disclosure and generally designated by the reference numeral 10 will be described.

As best illustrated in FIGS. 1 through 11, the fishing net support system 10 generally comprises a boat mount 12 configured to be mounted onto a boat hull 14. The boat hull 14 is not limited to any particular type of watercraft and may include, for example, canoes, kayaks, and other fishing boats with persons typically fishing with a rod and reel combination. The boat mount 12 includes a plate 16 having a top side 18 and a bottom side 20. A plurality of fasteners 22 is extendable through the plate 16 and into the boat hull 14. More particularly, the bottom side 20 is positionable on a gunwale 24 of the boat hull 14 such that the system 10 extends upwardly from the boat hull 14 and can extend over water 26.

Figure 6:
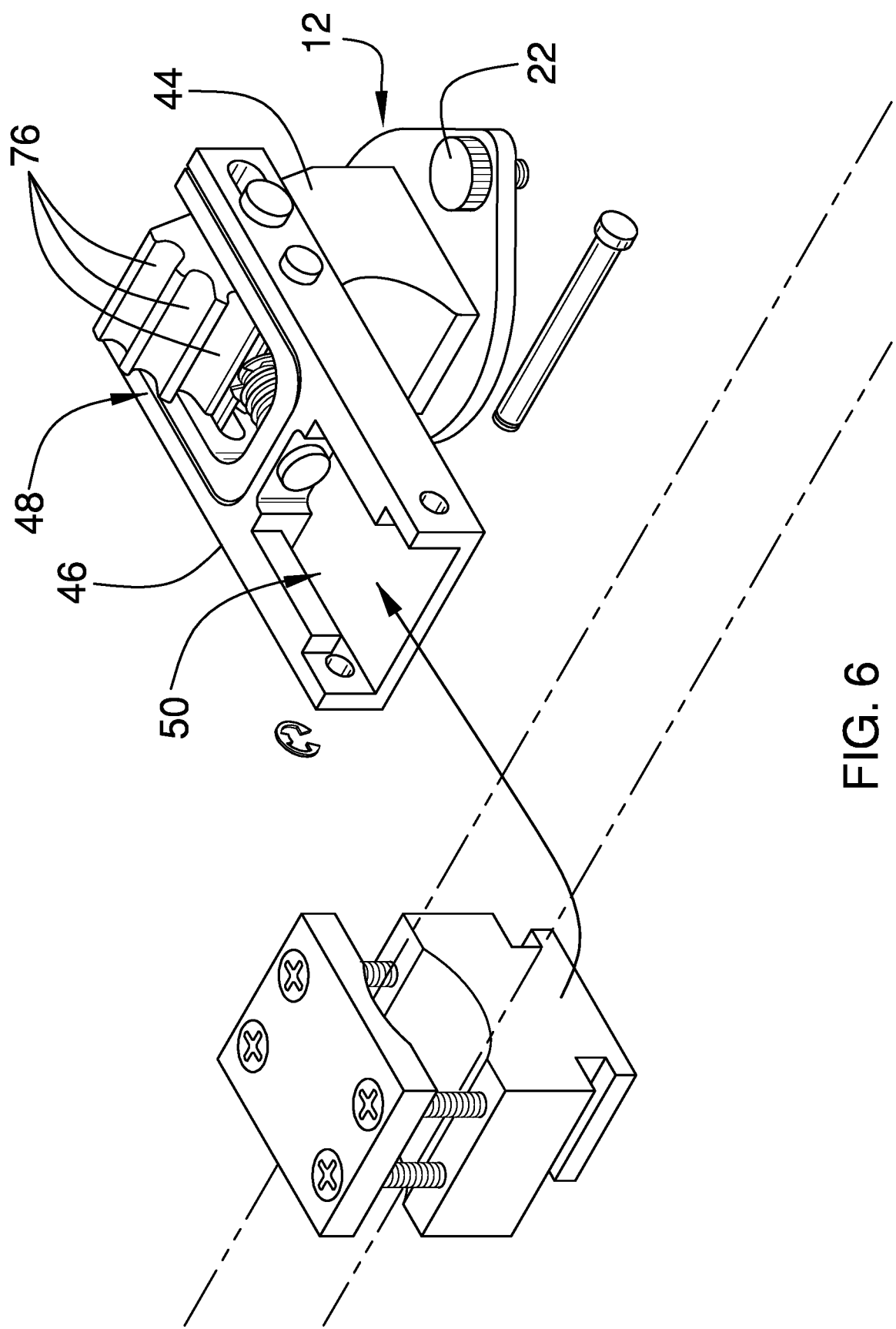
FIG. 6 is a front exploded view of an embodiment of the disclosure.
Figure 7:
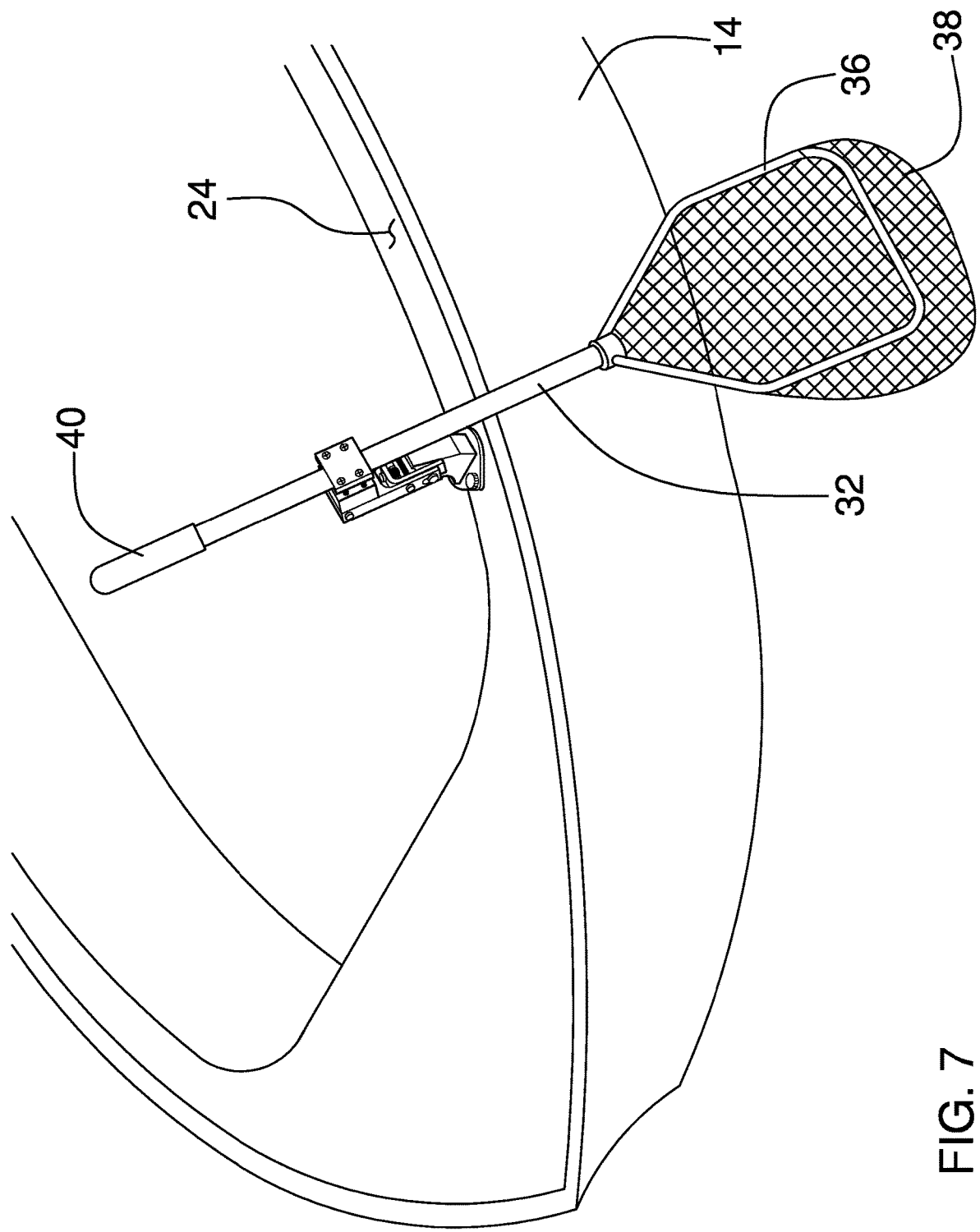
FIG. 7 is a front isometric in-use view of an embodiment of the disclosure.
Figure 8:
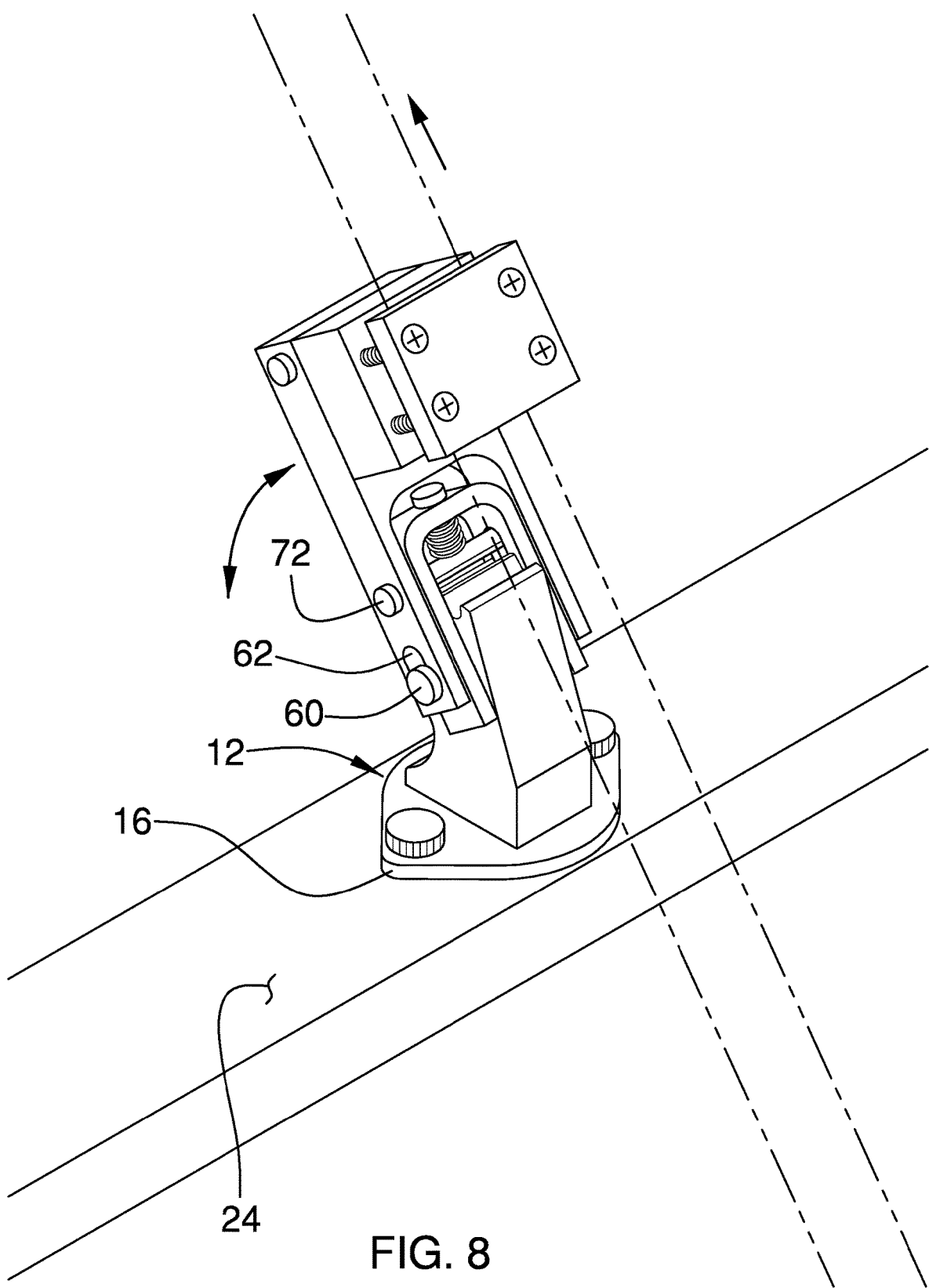
FIG. 8 is a rear isometric view of an embodiment of the disclosure.
Figure 9:
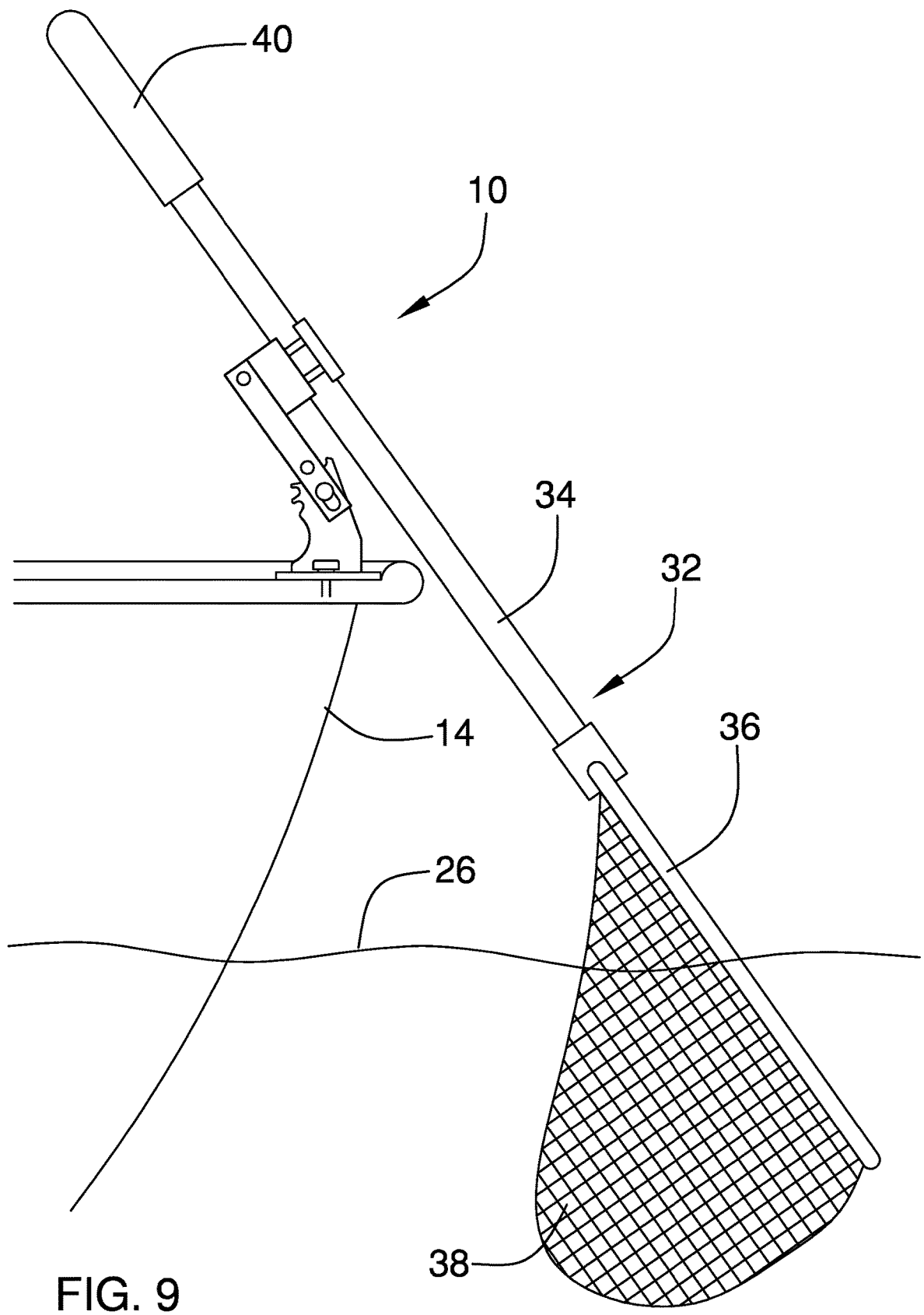
FIG. 9 is a side in-use view of an embodiment of the disclosure.

A linkage 28 is attached to the boat mount 12 and a receiver 30, configured to receive a pole 34 of a fishing net 32, is mounted on the linkage 28. The fishing net 32 a conventional fishing net used while fishing from a boat and includes a pole 34 and a loop 36 attached to one end of the pole 34. A receiving net 38 is attached to and extends along the loop 36. A grip 40 may be attached to the pole 34 opposite of the loop 36. The receiver 30, as shown in FIG. 1, may include a sleeve 42 having a pole receiving area therein which may be adjusted to be made smaller or larger while accommodating the size of the pole 34. While FIG. 1 depicts a receiver 30 with a panel being attached by multiple screws to a base, other embodiments may include a semicircular panel pivotally coupled to the base and secured in a closed condition with a fastener. Still additional embodiments may utilize materials that are resiliently compressible to retain the pole 34 in position. However, materials may be used to allow the pole 34 to slide relative to the receiver 30 such that the loop 36 can be moved toward or extended away from the receiver 30. As can be seen in FIG. 6, the receiver 30 may be removable from the linkage 28 for replacement of the receiver 30 with different types of receivers 30.

Generally, the linkage 28 allows pivoting between the boat mount 12 and the receiver 30 within a vertical plane. The linkage 28 may be structured such that movement within the vertical plane is the only movement allowed, though the linkage 28 could include a vertically orientated axis of rotation with the boat mount 12 or the receiver 30. The linkage 28 includes a vertical support 44 that is attached to and extends upwardly from the boat mount 12. A lateral support 46 is pivotally attached to the vertical support 44 and extends away from the vertical support 44 in a generally lateral direction. A locking member 48 releasably locks the lateral support 46 to the vertical support 44 to resist pivoting between the lateral support 46 and the vertical 44 support. The locking member 48 is positionable in a released position allowing pivoting between the lateral 46 and vertical 44 supports such that an outer area 50 of the lateral support 46 positioned distal to the vertical support 44 is vertically movable relative to the boat mount 12. That is, the outer area 50 can be pivoted upwardly and downwardly as shown by the arrows in FIG. 8. The receiver 30 will typically be positioned on the outer area 50.

In one exemplary embodiment, the lateral support 46 has a first end 52 and a second end 54 positioned opposite of each other. The first end 52 has a channel 56 extending therethrough to define a pair of arms 58 positioned laterally of the channel 56. The vertical support 44 is positioned in the channel 56 and between the arms 58. A pivot pin 60 extends through the arms 58 and the vertical support 44 to pivotally couple the lateral support 46 to the vertical support 44. Each of the arms 58 has a slot 62 therein through which the pivot pin 60 extends and the slots 62 in the arms are each elongated along a line extending through the first 52 and second 54 ends such that the second end 54 is movable away or toward the vertical support 44.

In this embodiment, the locking member 48 further includes a bracket 64 that is positioned in the channel 56. The bracket 64 includes a base 66 and a pair of legs 68. The base 66 is positioned distal to the first end 52 and each of the legs 68 extends along one of the arms 58. Each of the legs 68 has an opening 70 extending therethrough. The pivot pin 60 extends through the openings 70 in the legs 68 to pivotally couple the bracket 64 to the vertical support 44. The slots 62 are elongated with respect to the openings 70 such that the bracket 64 is statically retained relative to the vertical support 44 when the first end 52 is moved away from the vertical support 44. A locking pin 72 extends through apertures 74 positioned in each of the legs 68 and each of the arms 58. The pivot pin 60 is positioned between the locking pin 72 and the first end 52 of the lateral support 46. The apertures 74 in the legs 68 are elongated with respect to the apertures 74 in the arms 58 and are elongated in a same direction of elongation as the slots 62 such that the locking pin 72 is movable relative to bracket 64 when the lateral support 46 is moved away from the vertical support 44. The vertical support 44 has a plurality of grooves 76 positioned therein and each is elongated along a line orientated perpendicular to an axis of the pivot pin 60. The locking pin 72 is removably positionable in each of the grooves 76 to alter an angle of receiver 30 relative to a horizontal plane.

A biasing member 78 bias the locking pin 72 into one of the grooves 76. The biasing member 78 includes a rod 80 extending through the lateral support 46 and into the channel 56. The rod 80 extends through the base 66 and toward the vertical support 44. A stop 82 is positioned on the rod 80 between the legs 68 and distal to the base 66. A compression spring 84 is positioned on the rod 80 and biases the base 66 away from the stop 82 to pull the second end 54 of the lateral support 46 toward the vertical support 44. This in turn retains the locking pin 72 in a selected one of the grooves 76.

Figure 10:
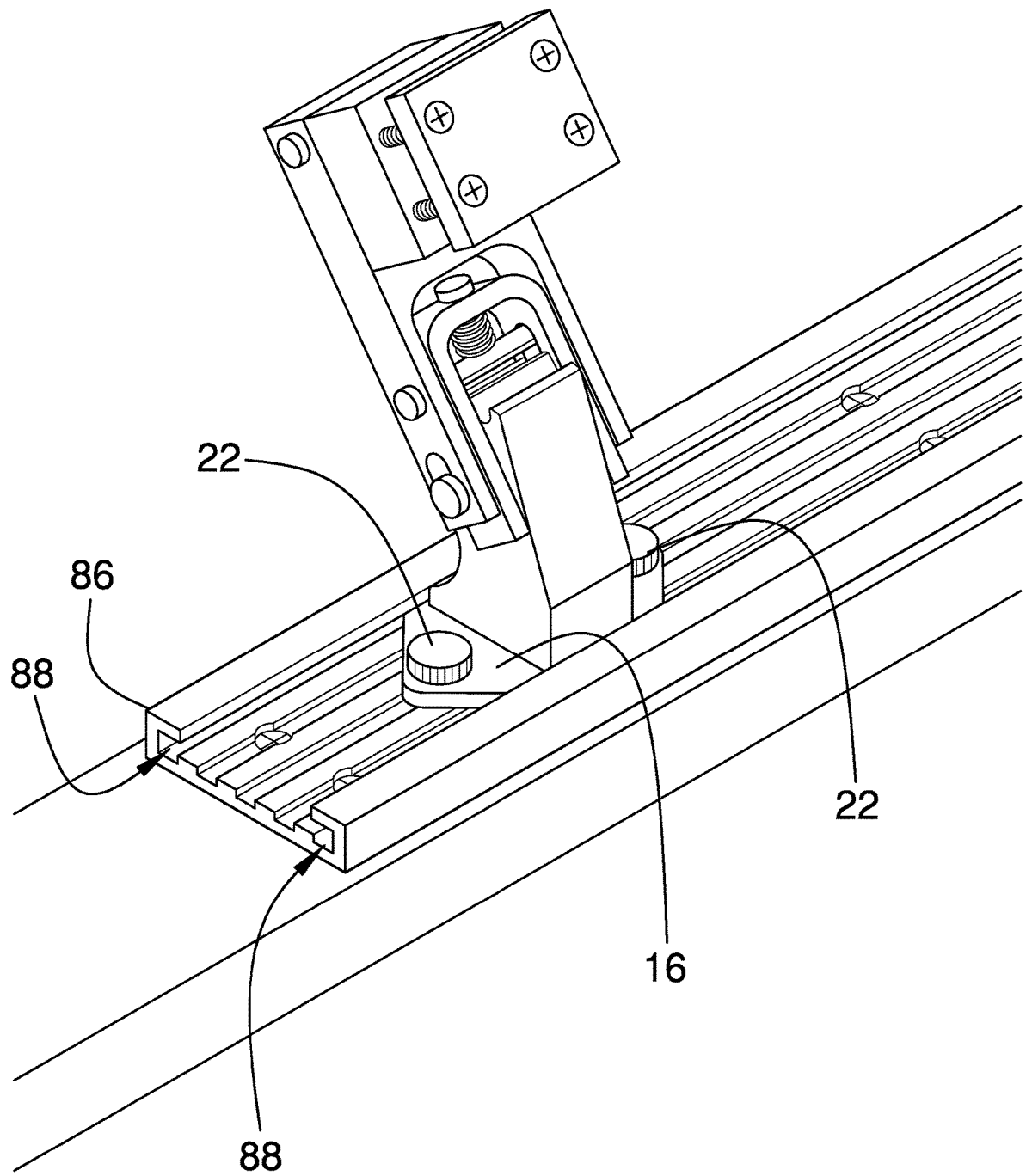
FIG. 10 is a top isometric view of another embodiment of the disclosure.
Figure 11:
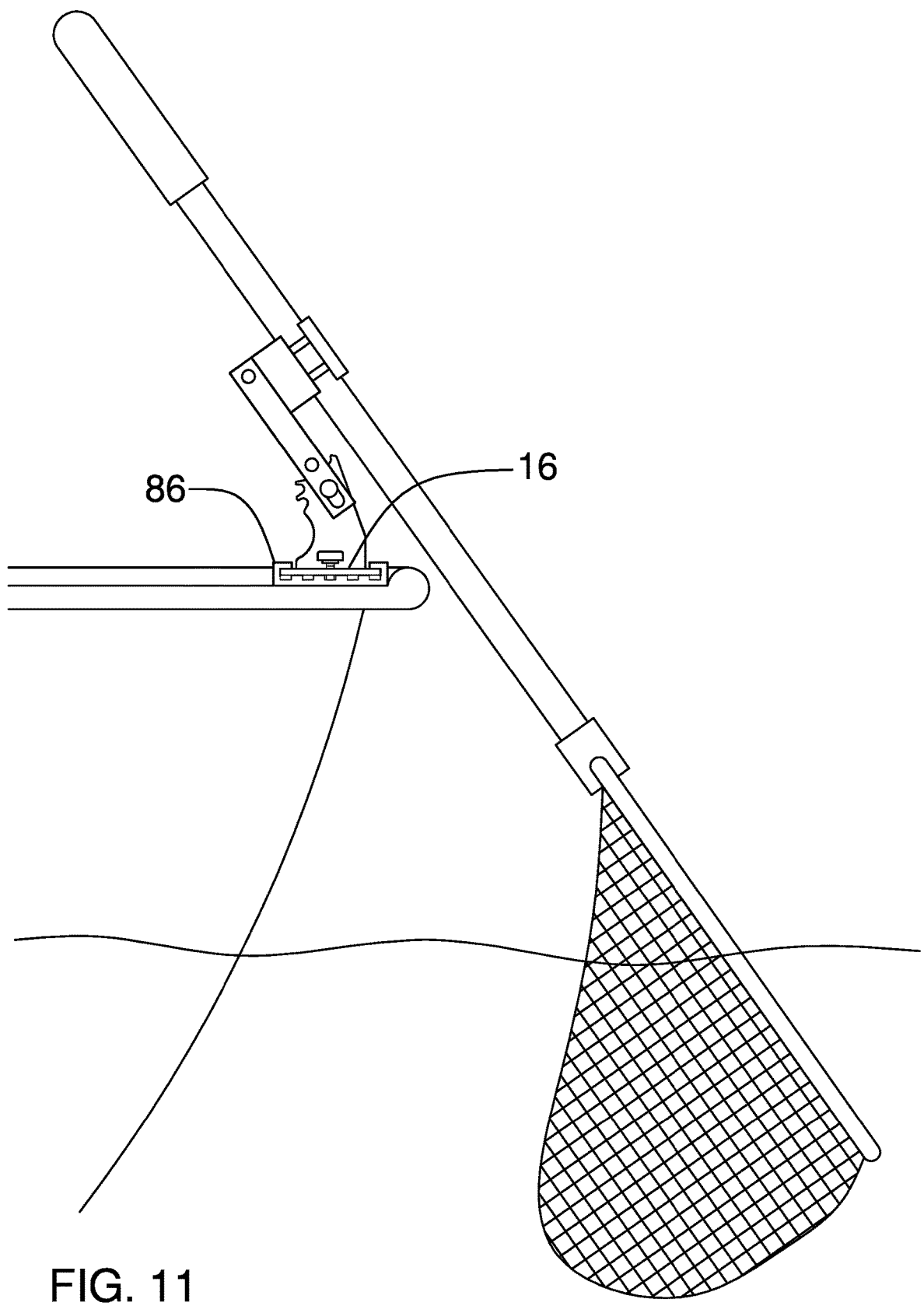
FIG. 11 is a side view of the embodiment disclosed in FIG. 10.

In an embodiment shown in FIGS. 10 and 11, the boat hull 14 further comprises a track 86. The track 86 is conventional to fishing boats and is often used to hold fishing poles while fishing. The track 86 is elongated and allows articles attached thereto to slide along the track 86 and be secured where desired without the requirement for a plurality of receiving apertures extending into the boat hull 14. Thus, one female receiver can be used for multiple mount locking locations. As can be seen in FIGS. 10 and 11, the plate 16 extends into slots 88 on either side of the track 86 such that the plate 16 is slidable along the track 86. The fasteners 22 are rotated to extend downwardly toward and against the track 86 and to lift and bias the plate 16 upwardly against an upper wall of the slots 88 to hold the plate 16 in a selected location. Other tracks may include fasteners 22 that engage directly track or which include threaded fasteners to secure the plate 16 in position. Regardless, the track 86 is considered as an integral part of the boat hull 14 for the purposes defined herein.

In use, a user mounts the fishing net 32 into the receiver 30 as described above and as shown in the Figures. Once the fishing net 32 is held in place, it will be non-movable while the locking member 48 is engaged. As should be understood from the drawings, the user can take hold of the grip 40 and move the grip 40 away from the boat mount 12 to disengage the locking pin 72 from its selected groove 76. This will then allow the user to pivot the fishing net 32, as needed, to retrieve a fish. While not shown, the arrangement may be reversed such that by pulling on the grip 40 the user will disengage the locking member 48. Regardless, the receiver 30 allows the user to easily manipulate a fishing net 32 with one hand while also ensuring that the fishing net 32 is easily obtained in a convenient area of the boat. The system 10 facilitates a person's ability to fish alone by being able to manipulate the fishing net with one hand and a fishing rod with the other. When the grip is released, the spring reengages the locking member 48 to prevent movement of the fishing net 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing net holding system comprising:
    a boat hull having an upper edge defining a gunwale;
    a fishing net including a pole and a loop attached to one end of the pole, a receiving net being attached to and extending along the loop, a grip being attached to the pole opposite of the loop;
    a boat mount mounted onto the gunwale;
    a linkage being attached to the boat mount; and
    a receiver mounted on the linkage, the pole being releasably positioned within the receiver such that the loop is positioned outside of an area bounded by the boat hull, the linkage allowing pivoting between the boat mount and the receiver within a single, vertically orientated plane to allow the loop to be moved upwardly and downwardly relative to the boat hull; and
    the linkage being actuated to a disengaged position allowing pivoting of the fishing net relative to the boat hull and an engaged position inhibiting pivoting of the fishing net relative to the boat hull, actuation of the linkage from the engaged position to the disengaged position being effected by movement of the grip in a first direction relative to a vertical support of the linkage, actuation of the linkage from the disengaged positioned to the engaged position being effected by movement of the grip in a second direction relative to the vertical support of the linkage, said first direction and said second direction being along a linear path and in opposite directions with respect to each other.

2. The fishing net holding system according to claim 1, wherein the boat mount includes a plate having a top side and a bottom side, a plurality of fasteners being extendable through the plate and engaging the boat hull such that the bottom side faces the boat hull.

3. The fishing net holding system according to claim 1, wherein the linkage includes:
    the vertical support being attached to and extending upwardly from the boat mount;
    a lateral support being pivotally attached to the vertical support and extending away from the vertical support, the lateral support being pivotable in the single, vertically oriented plane; and
    a locking member releasably locking the lateral support to the vertical support to resist pivoting between the lateral support and the vertical support, the locking member being positionable in a released position allowing pivoting between the lateral and vertical supports such that an outer area of the lateral support positioned distal to the vertical support is vertically movable relative to the boat mount, the receiver being positioned on the outer area.

4. The fishing net holding system according to claim 3, further including:
    the lateral support having a first end and a second end positioned opposite of each other, the first end having a channel extending therethrough to define a pair of arms positioned laterally of the channel, the vertical support being positioned in the channel and between the arms; and
    a pivot pin extending through the arms and the vertical support to pivotally couple the lateral support to the vertical support.

5. The fishing net holding system according to claim 4, wherein each of the arms has a slot therein through which the pivot pin extends, the slots in the arms each being elongated along a line extending through the first and second ends such that the second end is movable away from the vertical support in the first direction or toward the vertical support in the second direction, the lateral support being pivotable when the second end is moved away from the vertical support and being locked in a static condition relative to the vertical when the second end is moved toward the vertical support.

6. The fishing net holding system according to claim 5, further including a biasing member biasing the second end toward the vertical support, wherein the biasing member biases against movement of the grip in the first direction.

7. The fishing net holding system according to claim 3, further including:
    the vertical support having a plurality of grooves positioned therein; and
    the locking member including:
        a locking pin being removably positionable in one of the plurality of grooves, the vertical support being locked at a selected position when the locking pin is positioned in one of the grooves;
        the biasing member biasing the locking pin into one of the plurality of grooves; and
        the second end of the lateral support being movable away from the vertical support to disengage the locking pin from one of the plurality of grooves.

8. The fishing net holding system according to claim 3, wherein the locking member is in the released position to allow pivoting between the vertical and lateral supports when the second end of the lateral support is moved away from the vertical support, and the locking member is in an engaged position inhibiting pivoting between the vertical and lateral supports when the second end is moved toward the vertical support and the locking pin is positioned in one of the grooves.

9. The fishing net holding system according to claim 8, wherein the biasing member biases the locking member into the engaged position.

10. The fishing net holding system according to claim 1, wherein the linkage further includes a biasing member biasing against movement of the grip in the first direction to retain the linkage in the engaged position.

11. The fishing net holding system according to claim 10, wherein the boat hull comprises a track, the mount including a plate being slidable along the track.

12. The fishing net holding system according to claim 1, wherein the boat hull comprises a track, the mount including a plate being slidable along the track.

13. A fishing net holding system comprising:
 a boat hull having an upper edge defining a gunwale;
 a fishing net including a pole and a loop attached to one end of the pole, a receiving net being attached to and extending along the loop, a grip being attached to the pole opposite of the loop;
 a boat mount mounted onto the gunwale;
 a linkage being attached to the boat mount; and
 a receiver mounted on the linkage, the pole being releasably positioned within the receiver such that the loop is positioned outside of an area bounded by the boat hull, the linkage allowing pivoting between the boat mount and the receiver within a single, vertically orientated plane to allow the loop to be moved upwardly and downwardly relative to the boat hull;
 the linkage being actuated to a disengaged position allowing pivoting of the fishing net relative to the boat hull and an engaged position inhibiting pivoting of the fishing net relative to the boat hull, actuation of the linkage from the engaged position to the disengaged position being effected by movement of the grip in a first direction relative to a vertical support of the linkage, actuation of the linkage from the disengaged position to the engaged position being effected by movement of the grip in a second direction relative to the vertical support of the linkage, said first direction and said second direction being along a linear path and in opposite directions with respect to each other;
 wherein the linkage includes:
  the vertical support being attached to and extending upwardly from the boat mount;
  a lateral support being pivotally attached to the vertical support and extending away from the vertical support, the lateral support being pivotable in the single, vertically oriented plane; and
  a locking member releasably locking the lateral support to the vertical support to resist pivoting between the lateral support and the vertical support, the locking member being positionable in a released position allowing pivoting between the lateral and vertical supports such that an outer area of the lateral support positioned distal to the vertical support is vertically movable relative to the boat mount, the receiver being positioned on the outer area;
  the lateral support having a first end and a second end positioned opposite of each is other, the first end having a channel extending therethrough to define a pair of arms positioned laterally of the channel, the vertical support being positioned in the channel and between the arms;
  a pivot pin extending through the arms and the vertical support to pivotally couple the lateral support to the vertical support;
  wherein each of the arms has a slot therein through which the pivot pin extends, the slots in the arms each being elongated along a line extending through the first and second ends such that the second end is movable away from the vertical support in the first direction or toward the vertical support in the second direction, the lateral support being pivotable when the second end is moved away from the vertical support and being locked in a static condition relative to the vertical when the second end is moved toward the vertical support; and
  wherein the locking member includes:
   a bracket being positioned in the channel, the bracket including a base and a pair of legs, the base being positioned distal to the first end and each of the legs extending along one of the arms, each of the legs having an opening extending therethrough, the pivot pin extending through the openings in the legs to pivotally couple the bracket to the vertical support, the slots being elongated with respect to the openings such that the bracket is statically retained relative to the vertical support when the first end is moved away from the vertical support;
   a locking pin extending through apertures positioned in each of the legs and each of the arms, the pivot pin being positioned between the locking pin and the first end of the lateral support, the apertures in the legs being elongated with respect to the apertures in the arms, the apertures in the legs being elongated in a same direction of elongation as the slots such that the locking pin is movable relative to the bracket when the lateral support is moved away from the vertical support;
   the vertical support having a plurality of grooves positioned therein and each being elongated along a line orientated perpendicular to an axis of the pivot pin, the locking pin being removably positionable in each of the grooves to alter an angle of the receiver relative to a horizontal plane; and
   a biasing member biasing the locking pin into one of the grooves.

14. The fishing net holding system according to claim 13, wherein the biasing member includes:
 a rod extending through the lateral support and into the channel, the rod extending through the base and toward the vertical support;
 a stop being positioned on the rod between the legs and distal to the base; and
 a compression spring being positioned on the rod and biasing the base away from the stop to pull the second end of the lateral support toward the vertical support.

* * * * *